(12) United States Patent
Guha Thakurta et al.

(10) Patent No.: US 11,893,672 B2
(45) Date of Patent: Feb. 6, 2024

(54) CONTEXT REAL AVATAR AUDIENCE CREATION DURING LIVE VIDEO SHARING

(71) Applicant: INTERNATIONAL BUSINESS MACHINES CORPORATION, Armonk, NY (US)

(72) Inventors: Sanjay Guha Thakurta, Kolkata (IN); Sarbajit K. Rakshit, Kolkata (IN); Karthik Krishnan, Chennai (IN); Venkataramana Logasundaram Jaganathan, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 17/189,298

(22) Filed: Mar. 2, 2021

(65) Prior Publication Data
US 2022/0284648 A1 Sep. 8, 2022

(51) Int. Cl.
*G06T 13/40* (2011.01)
*G06F 16/951* (2019.01)
*G16Y 20/40* (2020.01)

(52) U.S. Cl.
CPC ............ *G06T 13/40* (2013.01); *G06F 16/951* (2019.01); *G16Y 20/40* (2020.01)

(58) Field of Classification Search
CPC ......... G06T 19/006; A63F 13/86; H04L 67/10
See application file for complete search history.

(56) References Cited

U.S. PATENT DOCUMENTS 9,268,406 B2   2/2016 Geisner
2010/0251173 A1*  9/2010 Imanishi ............ H04N 7/17318
                                                    715/810
(Continued)

FOREIGN PATENT DOCUMENTS

GB          2436422 B      2/2008

OTHER PUBLICATIONS

Hitti, "Samsung's artificial Neon humans are "a new kind of life"," dezeen, Jan. 15, 2020, Retrieved from the Internet: <https://www.dezeen.com/2020/01/15/samsung-neon-star-labs-artificial-humans/>, 16 pages.
(Continued)

*Primary Examiner* — Weiming He
(74) *Attorney, Agent, or Firm* — Robert R. Aragona

(57) ABSTRACT

An embodiment for creating an avatar of an online viewer during a live video broadcast is provided. The embodiment may include receiving a number of in-person viewers at an event. The embodiment may also include identifying a number of online viewers watching the event remotely. The embodiment may further include in response to determining the number of in-person viewers at the event is below a threshold, identifying a location of the in-person viewers at the event. The embodiment may also include analyzing reactions of the online viewers to scenarios of the event. The embodiment may further include creating an avatar for each of the online viewers. The embodiment may also include populating each empty seat at the event with the created avatar for each online viewer. The embodiment may further include displaying the created avatars occupying the empty seats to the online viewers.

17 Claims, 8 Drawing Sheets

(56) References Cited

U.S. PATENT DOCUMENTS

| | | | | |
|---|---|---|---|---|
| 2013/0268870 | A1* | 10/2013 | Dawson | A63F 13/87 |
| | | | | 715/757 |
| 2014/0129559 | A1* | 5/2014 | Estes | G06Q 10/10 |
| | | | | 707/737 |
| 2016/0267699 | A1* | 9/2016 | Borke | G06F 3/017 |
| 2017/0003740 | A1 | 1/2017 | Verfaillie | |
| 2017/0052650 | A1* | 2/2017 | Koolwal | G06F 16/487 |
| 2017/0095732 | A1* | 4/2017 | Ghaffari | A63F 13/213 |
| 2019/0102941 | A1* | 4/2019 | Khan | G06T 19/006 |
| 2019/0105568 | A1 | 4/2019 | Platt | |
| 2020/0351321 | A1 | 11/2020 | Lueth | |

OTHER PUBLICATIONS hotstar.com, "Sports," [accessed Dec. 14, 2020], Retrieved from the Internet: <https://www.hotstar.com/in/sports>, 5 pages.

Keh, "We Hope Your Cheers for This Article are for Real," The New York Times, Jun. 16, 2020, [accessed Dec. 14, 2020], Retrieved from the Internet: <https://www.nytimes.com/2020/06/16/sports/coronavirus-stadium-fans-crowd-noise.html>, 6 pages.

Kelly, "Neon's 'artificial human' is a scary glimpse of the future that's (mostly) still hype," CNN Business, Jan. 10, 2020, Retrieved from the Internet: <https://edition.cnn.com/2020/01/10/tech/samsung-neon/index.html>, 5 pages.

Martin, "Virtual crowds and stadium noise greet return of La Liga," Eurosport, Oct. 6, 2020, [accessed Dec. 14, 2020], Retrieved from the Internet: <https://www.eurosport.com/football/virtual-crowds-and-stadium-noise-greet-return-of-la-liga_sto7771470/story.shtml>, 7 pages.

Mell et al., "The NIST Definition of Cloud Computing", National Institute of Standards and Technology, Special Publication 800-145, Sep. 2011, 7 pages.

Varley, "Fifa crowd noise and zoom calls: How to create an atmosphere without fans," BBC Sport, Jun. 12, 2020, Retrieved from the Internet: <https://www.bbc.com/sport/football/52935673>, 8 pages.

Wikipedia, "Westfalenstadion," Wikipedia, The Free Encyclopedia, [accessed on Dec. 14, 2020], Retrieved from the Internet: <https://en.wikipedia.org/wiki/Westfalenstadion>, 5 pages.

Riach, "Manchester United appoint specialist to improve Old Trafford atmosphere," The Guardian.com, Apr. 5, 2013, Retrieved from the Internet: https://www.theguardian.com/football/2013/apr/05/manchester-united-old-trafford-atmosphere, 2 pages.

\* cited by examiner

US 11,893,672 B2

CONTEXT REAL AVATAR AUDIENCE CREATION DURING LIVE VIDEO SHARING

BACKGROUND

The present invention relates generally to the field of computing, and more particularly to a system for creating an avatar of an online viewer during a live video broadcast.

When broadcasting a live video of any event, such as a sporting event, the stadium or arena in which the event is taking place may not be filled to capacity. In the past, these events would be broadcast along with a background of the in-person audience attending the event and the empty seats that were not filled by actual people. Presently, these events may be broadcast nationally or internationally on television and/or a variety of streaming platforms in which millions of viewers may be watching remotely, such as online. Through cameras and other IoT Devices, images of these online viewers may be captured during the live event. The amount of people attending the event may be one of the factors which enhance the experience of the online viewers. Thus, if a sparse in-person audience is attending the event, it may be desirable to augment the in-person audience.

SUMMARY

According to one embodiment, a method, computer system, and computer program product for creating an avatar of an online viewer during a live video broadcast is provided. The embodiment may include receiving a number of in-person viewers at an event. The embodiment may also include identifying a number of online viewers watching the event remotely. The embodiment may further include in response to determining the number of in-person viewers at the event is below a threshold level, identifying a location of the in-person viewers at the event. The embodiment may also include analyzing reactions of the online viewers to scenarios of the event. The embodiment may further include creating an avatar for each of the online viewers based on online profiles of the online viewers. The created avatar for each online viewer may be altered during the event based on the analyzed reactions. The embodiment may also include populating each empty seat at the event with the created avatar for each online viewer. The embodiment may further include displaying the created avatars occupying the empty seats to the online viewers.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
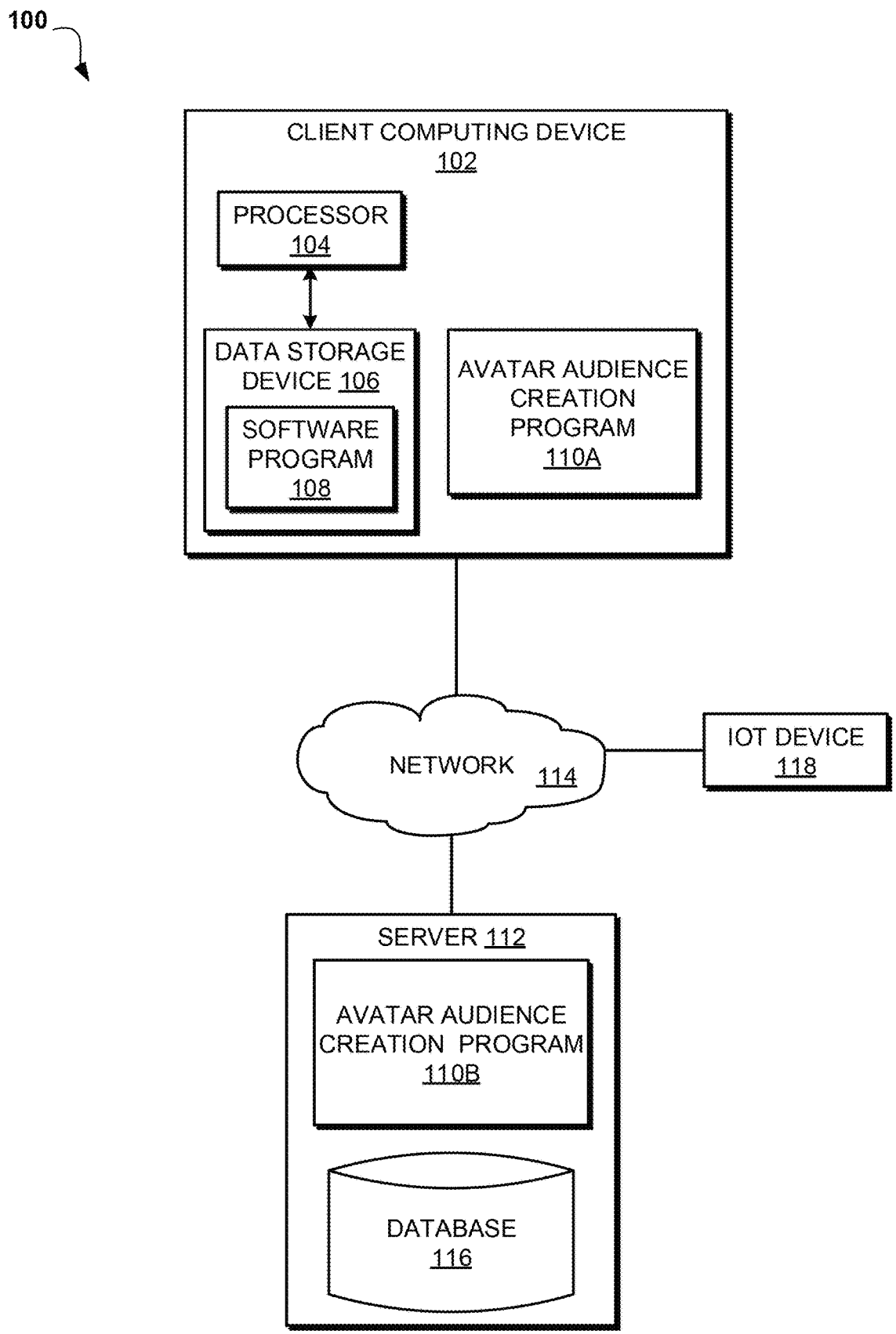
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for creating an avatar of an online viewer during a live video broadcast. The following described exemplary embodiments provide a system, method, and program product to, among other things, identify online viewers of an event and, accordingly, create an avatar of these online viewers that will be shown on a live broadcast of the event. Therefore, the present embodiment has the capacity to improve the technical field of avatar creation by capturing reactions of the online viewers in real-time and personalizing the avatars based on these reactions.

As previously described, when broadcasting a live video of any event, such as a sporting event, the stadium or arena in which the event is taking place may not be filled to capacity. In the past, these events would be broadcast along with a background of the in-person audience attending the event and the empty seats that were not filled by actual people. Presently, these events may be broadcast nationally or internationally on television and/or a variety of streaming platforms in which millions of viewers may be watching remotely, such as online. Through cameras and other IoT Devices, images of these online viewers may be captured during the live event. The amount of people attending the event may be one of the factors which enhance the experience of the online viewers. When there is no in-person audience attending the event, or even a small in-person audience, the interest of the online viewers in the event may be significantly reduced. This problem is typically addressed by playing music and/or pre-recorded crowd noise to energize the online viewers. However, playing music and/or pre-recorded crowd noise fails to capture the emotions of the entire online audience watching the event. It may therefore be imperative to have a system in place to enhance the viewing experience of the online viewers of the event when the in-person audience is few in number or nonexistent.

Thus, embodiments of the present invention may provide advantages including, but not limited to, enhancing the viewing experience of the online viewers who are watching a live broadcast of any event, producing context aware reaction in which the avatars mirror the reactions and emotions of the online viewers, and enabling event organizers to deliver the most appropriate audio/visual (AV) content based on the reactions and emotions of the online viewers.

According to at least one embodiment, a total number of in-person viewers and a total number of online viewers may be determined in order to determine a specific number of online viewers for whom an avatar should be created when the total number of in-person viewers falls below a threshold attendance level. The reactions of these online viewers may be analyzed so that the avatars can react synchronously with the online viewers when the avatars are populated into empty seats at the event. The avatars and their reactions may be displayed to the online viewers during a broadcast of the event.

According to at least one other embodiment, social media data may be used to interpret emotions of the online viewers. Traditional behavior patterns of the event and characteristics of the arena or stadium hosting the event may be identified to create the audio/visual (AV) content that will be displayed in the stadium.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify online viewers of an event and, accordingly, create an avatar of these online viewers that will be shown on a live broadcast of the event.

Referring to FIG. 1, an exemplary networked computer environment 100 is depicted, according to at least one embodiment. The networked computer environment 100 may include client computing device 102, a server 112, and IoT Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an avatar audience creation program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running an avatar audience creation program 110B and a database 116 and communicating with the client computing device 102 and IoT Device 118 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be connected to the communication network 114 and the IoT Device 118 may be a camera embedded in the television or stream, a sound sensor, a motion sensor, a microphone, a wearable device, and any other IoT Device 118 known in the art for detecting reactions of online viewers.

According to the present embodiment, the avatar audience creation program 110A, 110B may be a program capable of identifying the number of online viewers watching an event remotely, analyzing reactions and emotions of the online viewers, creating avatars for the online viewers, enhancing the viewing experience of the online viewers who are watching a live broadcast of any event, producing context aware reaction in which the avatars mirror the reactions and emotions of the online viewers, and enabling event organizers to deliver the most appropriate AV content based on the reactions and emotions of the online viewers. The avatar audience creation method is explained in further detail below with respect to FIGS. 2 and 3.

Figure 2:
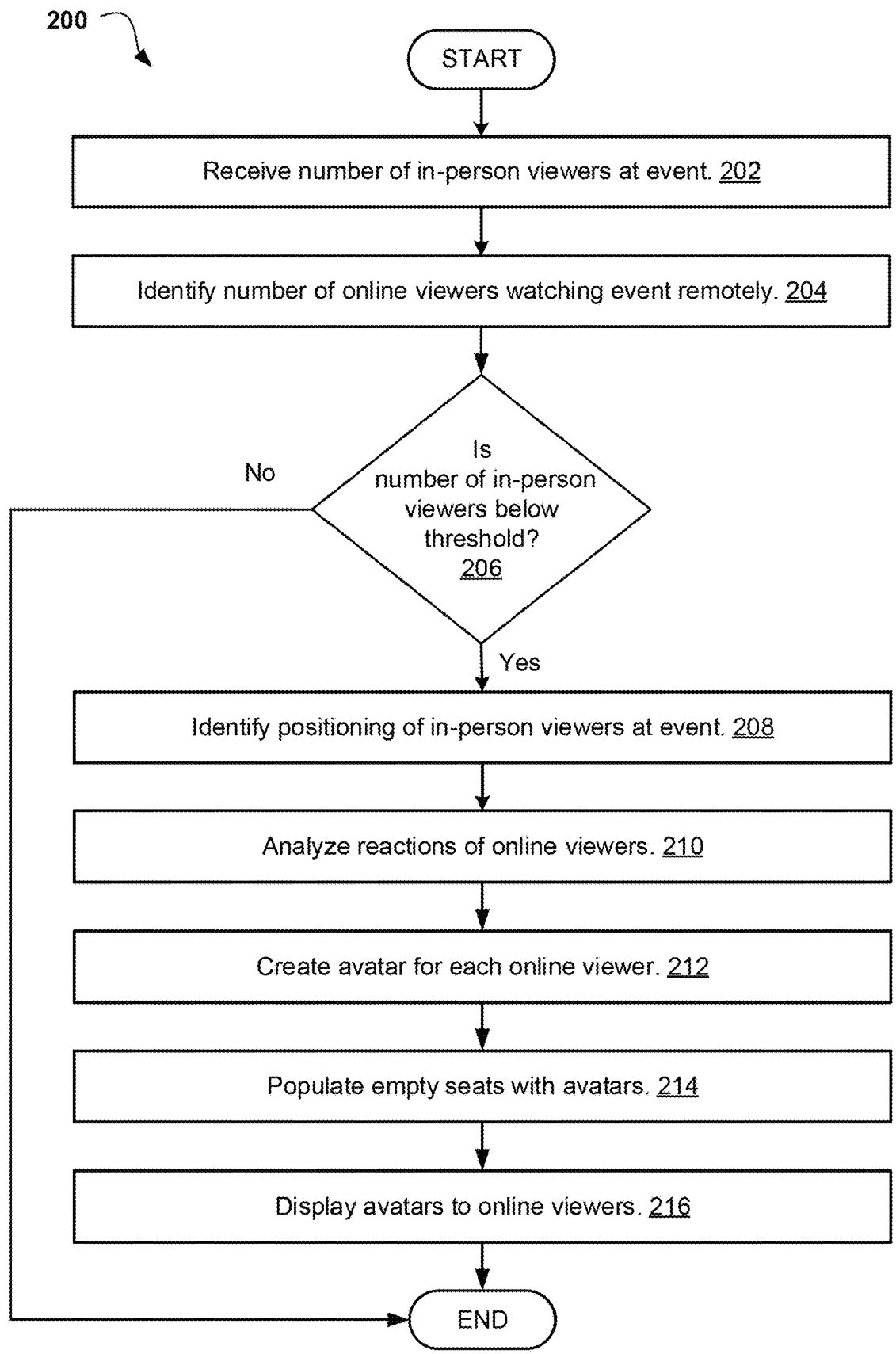
FIG. 2 illustrates an operational flowchart for creating an avatar of an online viewer in a real-time context avatar creation process according to at least one embodiment.

Referring now to FIG. 2, an operational flowchart for creating an avatar of an online viewer in a real-time context avatar creation process 200 is depicted according to at least one embodiment. At 202, the avatar audience creation program 110A, 110B receives the number of in-person viewers at the event. As used herein, "in-person" viewers means those viewers who are physically present at the location of the event. For example, a viewer physically present at Madison Square Garden® (Madison Square Garden and all Madison Square Garden-based trademarks and logos are trademarks or registered trademarks of MSG Entertainment Group, LLC and/or its affiliates) may be an in-person viewer in embodiments of the present invention. The number of in-person viewers may be obtained through known techniques of collecting attendance at a stadium or arena. Stadium and arena are used interchangeably herein and reflect the location where the event is taking place, however, any other event space or meeting place may be implemented in various embodiments of the presented invention. Such techniques of collecting attendance include the number of attendees who pass through a turnstile, the number of tickets scanned at the entrance of the arena, and the number of tickets sold on the internet. The number of in-person viewers may equal the arena's full capacity, may be less than the arena's full capacity, or may be zero, explained in further detail below.

Then, at 204, the avatar audience creation program 110A, 110B identifies the number of online viewers watching the event remotely. As used herein, "online viewers" means those viewers who are not physically present at the location of the event. For example, a viewer streaming a live broadcast of the event on the internet or watching a live broadcast on television may be an online viewer in embodiments of the present invention. The number of online viewers may also be obtained through known techniques of collecting remote viewership information. Such techniques of collecting remote viewership information include the number of viewers logged in to an online streaming service such as Twitch® (Twitch and all Twitch-based trademarks and logos are trademarks or registered trademarks of Amazon.com, Inc. and/or its affiliates), as well as the number of viewers tuned to the channel on which the event is broadcast as reported by a cable or satellite television provider.

Next, at 206, the avatar audience creation program 110A, 110B determines whether the number of in-person viewers at the event is below a threshold level. According to at least one embodiment, the determination may be made by utilizing historical learning and image content analysis to detect whether the arena has fewer in-person viewers for the current event than the average number of in-person viewers at past events. Continuing the example above, if the average in-person attendance at Madison Square Garden is 15,000, and the current event only has 10,000 in-person viewers, the determination may be made that the number of in-person viewers is below the threshold level. According to at least one other embodiment, when the number of in-person viewers is zero, the determination may be made automatically that the number of in-person viewers is below the threshold level. According to a further embodiment, the threshold level may be set manually by an organizer of the event. Continuing the example above, the event organizer may set the threshold level at 18,000 in-person viewers. If the maximum capacity of Madison Square Garden is 21,000, and the number of in-person viewers at the current event is 15,000, then the determination may be made that the number of in-person viewers is below the threshold level. In response to determining the number of in-person viewers at the event is below the threshold level, the real-time context avatar creation process 200 may proceed to step 208 to identify the positioning of the in-person viewers at the event. In response to determining the number of in-person viewers at the event is not below the threshold level, the real-time context avatar creation process 200 may end.

Then, at 208, the avatar audience creation program 110A, 110B identifies the location of the in-person viewers at the event. According to at least one embodiment, the location of the in-person viewers may be identified by utilizing the historical learning described above as well as video analysis. In particular, the historical learning and video analysis may be applied on the live video broadcast of the event that is shown to the online viewers. Continuing the example above, in an historical context, assume the west section of the upper bowl at Madison Square Garden has more empty seats compared with other sections of the arena. Thus, the avatar audience creation program 110A, 110B may make the presumption that the in-person viewers will be located away from the west section of the upper bowl and focus on the west section to populate the empty seats with the avatars of the online viewers, described in further detail below with respect to step 214. Continuing the example above, the video analysis may identify which seats are empty and which seats are occupied by the in-person viewers. The result of the video analysis may confirm the presumption of the avatar audience creation program 110A, 110B that the west section of the upper bowl is largely empty, or the video analysis may rebut the presumption, in which case it may not be necessary to populate as many empty seats with the avatars of the online viewers. Additionally, the result of the video analysis may determine that the number of in-person viewers is zero. When there are no in-person viewers, it may be necessary to populate most or all of the empty seats with the avatars of the online viewers.

Next, at 210, the avatar audience creation program 110A, 110B analyzes the reactions of the online viewers to scenarios of the event. The avatar audience creation program 110A, 110B may utilize various Internet of Things (IoT) Devices 118 connected to the network 114 to obtain the reactions of the online viewers. "Reactions" and "emotions" are used interchangeably herein. Examples of these IoT Devices 118 include, but are not limited to, a camera embedded in the television or streaming device, a sound sensor, a motion sensor, a microphone, a wearable device, and any other IoT Device 118 known in the art for detecting reactions of online viewers. Prior to watching the live video broadcast of the event, the online viewers may opt-in to provide an electronic agreement that their reactions can be analyzed. Examples of reactions include, but are not limited to, creation of noise, hand and arm gestures, and other forms of body movement. For example, the online viewer may raise his arms in excitement after his favorite team "Team A" scores a goal. In this example, the IoT Devices 118 may detect the arms of the online viewer raising. The IoT Devices 118 may also detect if the online viewer cheers in excitement. Examples of reactions may also include, but are not limited to, facial expressions, body posture, sighs, and other expressions of happiness or sadness. Continuing the example above, another online viewer, who is rooting for "Team B," may have a sad expression when "Team A" scores the goal. In this example, the IoT Devices 118 may detect a frowning facial expression and that the arms of the other online viewer are in a slumped position. The IoT Devices 118 may also detect if the other online viewer lets out a sigh in disappointment.

In the present embodiment, based on the reactions of the online viewers, the online viewers may be classified based on their preferences. Continuing the example above, the online viewer who cheered and raised his arms after "Team A" scored the goal may be classified as a fan of "Team A," whereas the other online viewer who lowered his arms and let out a sigh may be classified as a fan of "Team B." The avatar audience creation program 110A, 110B may create a knowledge corpus of the analyzed reactions of the online viewers in accordance with certain scenarios of the event. Continuing the example above, the cheer and arm raising of the online viewer rooting for "Team A" may be associated with "Team A" scoring the goal.

Additionally, the traditional reactions of the in-person viewers may be analyzed utilizing the various IoT Devices 118 and historical learning from the videos of past events. The traditional reactions of the in-person viewers and the scenarios in which those traditional reactions occur may also be stored in the knowledge corpus. Analyzing the reactions of the online viewers and the traditional reactions of the in-person viewers may allow the avatar audience creation program 110A, 110B to create context aware avatars of the online viewers, and appropriately populate the empty seats with the created avatars, described in further detail below with respect to steps 212 and 214, respectively.

Then, at 212, the avatar audience creation program 110A, 110B creates the avatar for each of the online viewers. The created avatar is based on online profiles of the online viewers. Additionally, the created avatar for each online viewer is altered during the event based on the analyzed reactions. In order to create the avatar, the avatar audience creation program 110A, 110B may utilize an avatar audience creation module which may gather information from the online profiles of the online viewers, such as the Twitch profiles of the online viewers. Such information about the online viewer contained in the profile may include, but is not limited to, gender, age, height, favorite team, and any other characteristics about the online viewer that may be utilized in creating the avatar. Continuing the example above, an avatar created for the online viewer who is rooting for "Team A" may have the same reactions and/or emotions as the actual online viewer on which the avatar is based. Continuing the example above, if the online viewer cheers and raises his arms when "Team A" scored the goal, the avatar of that online viewer may also cheer and raise its arms when "Team A" scores the goal. Conversely, if the other online viewer lowers his arms and lets out a disappointed sigh when "Team A" scores the goal, the avatar of that other online viewer may also lower its arms and let out a disappointed sigh when "Team A" scores the goal. Thus, the avatar may be a context-aware avatar that is created dynamically and in real-time.

Next, at 214, the avatar audience creation program 110A, 110B populates each empty seat at the event with the created avatar for each online viewer. According to at least one embodiment, the empty seats at the arena may be populated by projecting holograms of the avatars onto the empty seats. According to at least one other embodiment, digital pods may be placed onto the empty seats to display the avatars in the arena. These embodiments are explained in further detail below with respect to FIGS. 3 and 5. In the present embodiment, the created avatars may be populated into the empty seats based on the team preference of each online viewer, described above with respect to step 210. Utilizing the various IoT Devices 118 and historical learning from the videos of past events described above with respect to step 210 to obtain the traditional reactions and/or emotions of the in-person viewers at the event, the avatar audience creation program 110A, 110B may predict how many avatars should support one team and how many avatars should support another team. Continuing the example above, if "Team A" is the home team and "Team B" is the away team, the majority of avatars may support "Team A." Accordingly, when populating the avatars in the empty seats, the avatars supporting one team may be grouped together, and the avatars supporting another team may be grouped together. Continuing the example above, the avatars of the online viewers supporting "Team A" may be grouped together in one section of the arena, and the avatars of the online viewers supporting "Team B" may be grouped together in another section of the arena.

Then, at 216, the avatar audience creation program 110A, 110B displays the created avatars occupying the empty seats to the online viewers. The avatars may be displayed on the televisions and streaming devices on which the online users are watching the live broadcast of the event. According to at least one embodiment, each of the online viewers may be able to see the avatar that was created for them along with the reactions and/or emotions of the avatar. An arrow may be displayed in the live broadcast of the event pointing to a specific online viewer. For example, if John Doe is watching the event on his television, the arrow may be displayed on the television pointing to the avatar created for John Doe. According to at least one other embodiment, certain online viewers having priority status may be able to change the location of their avatars in the arena. Continuing the example above, if John Doe has a premium cable and/or satellite subscription, John Doe may request, via a user interface, his avatar to be moved to another section of the arena. In either embodiment, the online viewers may remove their avatars from the live video broadcast at any time by changing the channel, turning off the television or streaming device, of via the user interface. In either embodiment, where the number of online viewers exceeds the number of empty seats in the arena, the avatars may be displayed in the order in which the online viewers logged in to their streaming device or turned on their television. Similarly, a time limit for displaying each avatar of the online viewers may be imposed so that all of the online viewers can see their avatars at some point during the event.

Figure 3:
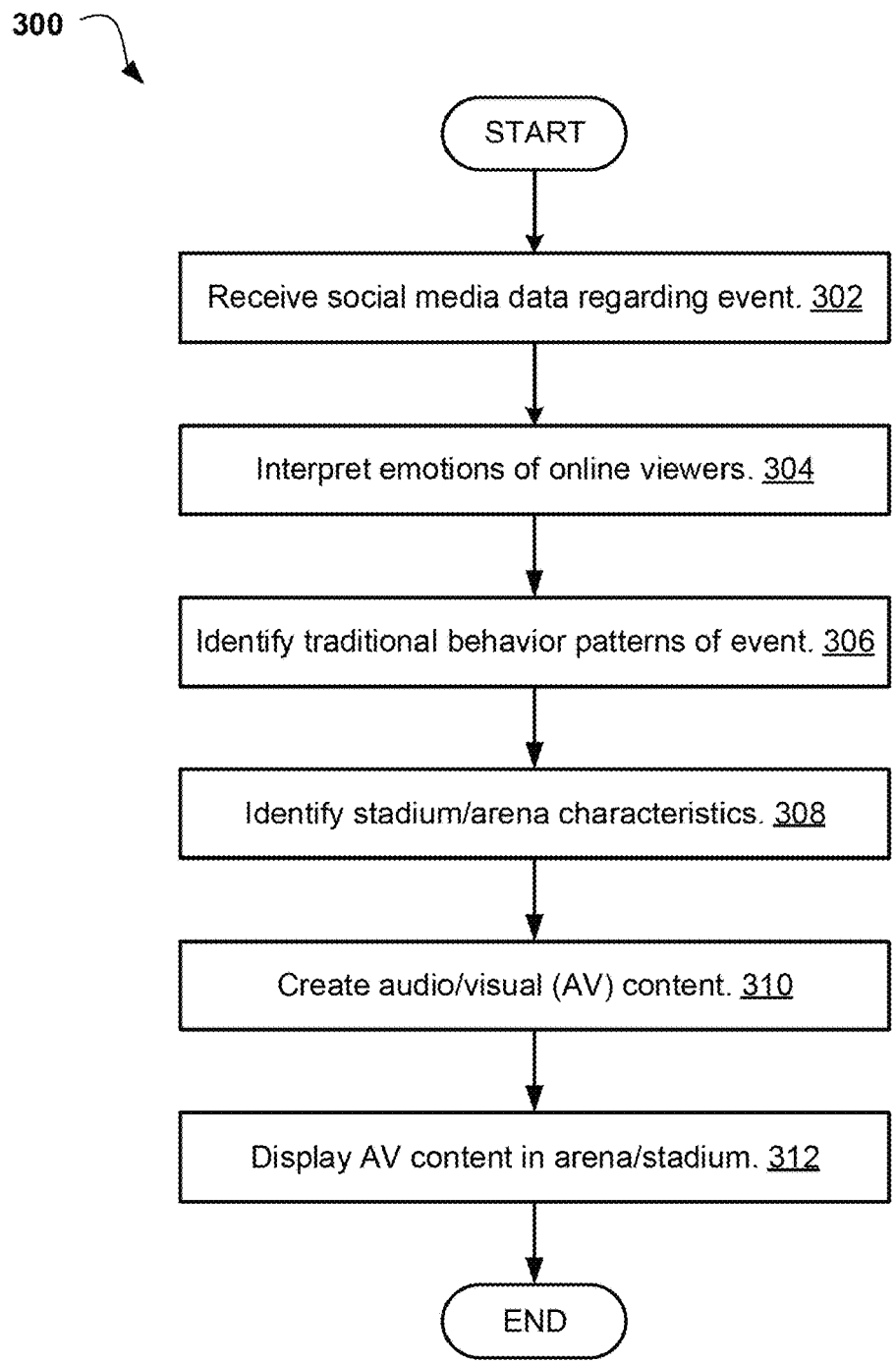
FIG. 3 illustrates an operational flowchart for simulating a crowd atmosphere during a live event in an audio/visual (AV) crowd simulation process according to at least one embodiment.

Referring now to FIG. 3, an operational flowchart for simulating a crowd atmosphere during a live event in an AV crowd simulation process 300 is depicted according to at least one embodiment. At 302, the avatar audience creation program 110A, 110B receives the social media data regarding the event. The social media data may include, but is not limited to, generated hashtags for the event, and text from social media timelines. For example, "#GoTeamA" may be posted by an online viewer on social media. Also, the online viewer may update his timeline status to say "I'm really excited to see Team A play Team B today!" The social media data may be ingested in real-time to capture the emotions of the online viewers in accordance with certain scenarios. Continuing the example above, the online viewer may post on his timeline "Yes! Great goal!" Thousands or hundreds of thousands of social media posts may be captured during the event.

Then, at 304, the avatar audience creation program 110A, 110B interprets the emotions of the online viewers. The emotions are interpreted based on the social media data. The social media data may be fed to a sentiment analytics engine, which may interpret and classify the emotions as positive, negative, or neutral utilizing natural language processing (NLP) and machine learning (ML). The classified emotions may be used to generate the most appropriate AV content that will be streamed in the arena, described in further detail below with respect to step 310.

Next, at 306, the avatar audience creation program 110A, 110B identifies the traditional behavior patterns of the event. The avatar audience creation program 110A, 110B may leverage information stored in an event behavior dictionary, such as the location of the arena, seating capacity of the arena, as well as the behavior of the in-person viewers to identify the traditional behavior patterns. For example, the in-person viewers in one city may traditionally be more raucous, e.g., in terms of decibels (dB), than the in-person viewers in another city. Also, the home arena of the more raucous in-person viewers may have a larger seating capacity. Thus, these behavior patterns may also be used to generate the most appropriate AV content that will be streamed in the arena, described in further detail below with respect to step 310.

Then, at 308, the avatar audience creation program 110A, 110B identifies the characteristics of the stadium hosting the event. The avatar audience creation program 110A, 110B may leverage information stored in an event acoustics data store, such as acoustics, e.g., in terms of dB level, roof height, placement of seats, visual characteristics, and placement of display screens to identify the characteristics of the stadium. For example, if one stadium has a roof, that stadium will likely be louder than another stadium that has no roof. In another example, where both stadiums have roofs, the stadium with the lower roof will likely be louder than the stadium with the higher roof. Continuing the example, if the stadium has many display screens, fewer digital pods will be needed to stream the AV content.

Next, at 310, the avatar audience creation program 110A, 110B creates the AV content. The AV content is created based on the traditional behavior patterns and the stadium characteristics described above with respect to steps 306 and 308, respectively. In addition, the classified emotions described above with respect to step 304 may be utilized in creating the appropriate AV content. This data on the traditional behavior patterns, stadium characteristics, and classified emotions may be sent to a crowd atmosphere engine. The various sounds, e.g., humming, cheering, booing, and songs, which make up the AV content to be played in the stadium may be stored in an AV media repository and are also sent to the crowd atmosphere engine. For example, if the home team is not playing well, and the classified emotion of the online viewers is negative, a tense humming sound may be extracted from the AV media repository. Continuing the example, if the home team scores a goal, and the classified emotion of the online viewers is positive, a cheerful song may be extracted from the AV media repository.

Then, at 312, the avatar audience creation program 110A, 110B displays the AV content in the stadium. The AV content may be extracted from the crowd atmosphere engine and fed to an edge streaming engine, from which the AV content may be propagated to an AV network of the stadium, described in further detail below with respect to FIG. 5. The AV content propagated to the AV network may then be displayed by the speakers and/or digital pods. The speakers and/or digital pods may be placed at strategic locations in the stadium for optimal sound simulation and visual grandeur. The strategic locations may be determined based on the stadium characteristics, the traditional behavior patterns of the in-person viewers, and the classified emotion of the online viewers. For example, in a soccer match, the event organizers for the home team may wish to place the majority of speakers and/or digital pods directly onto the seats behind the goals. In this manner, the avatars of the online viewers may be displayed on the digital pods, thus creating a "virtual wall" of fans at the stadium. This "virtual wall" may thus encourage a player on the home team, and intimidate a player on the away team.

Figure 4:
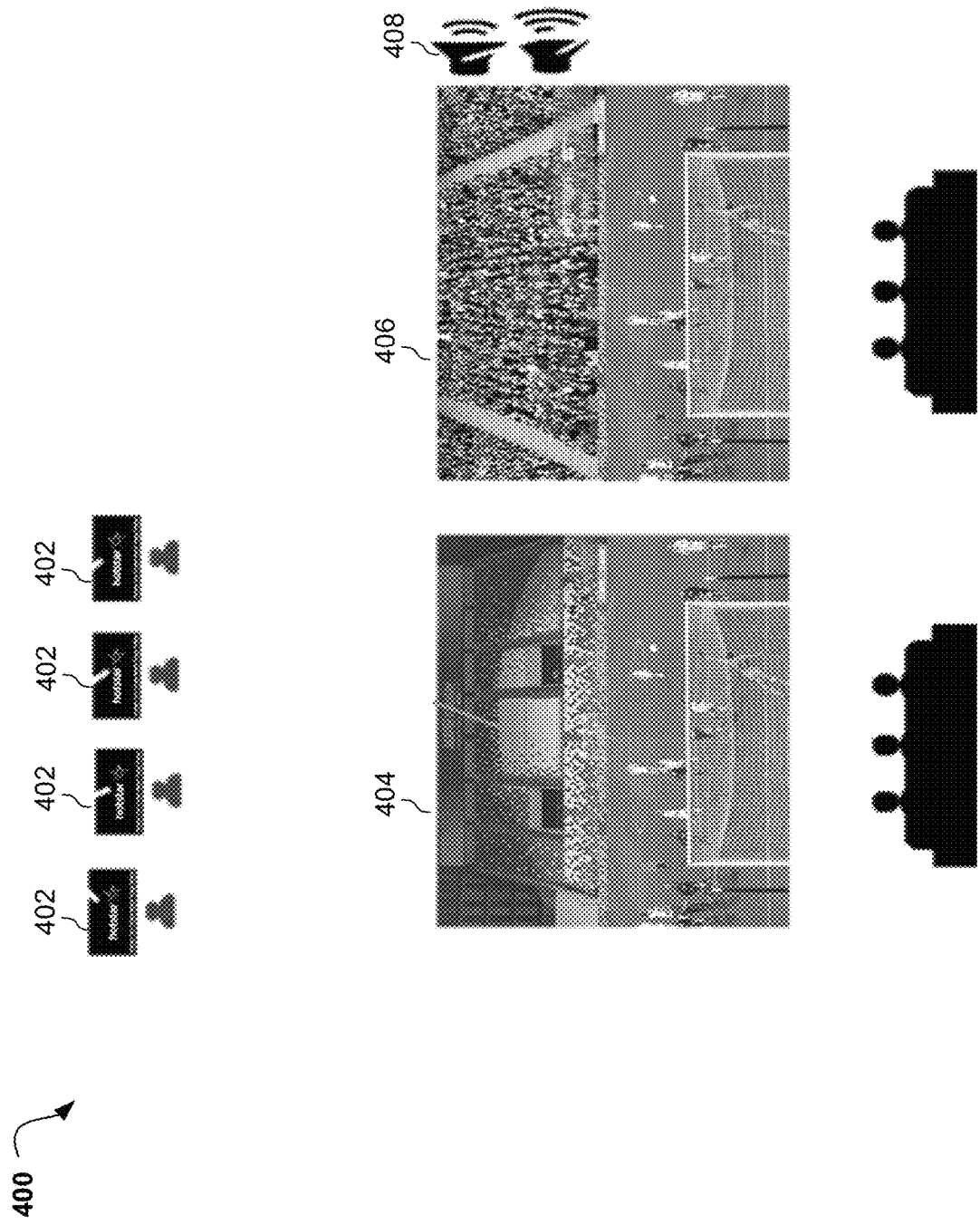
FIG. 4 is a diagram depicting the created avatars filling empty seats in an arena according to at least one embodiment.

Referring now to FIG. 4, a diagram 400 depicting the created avatars filling empty seats in the arena is shown according to at least one embodiment. The online viewers 402 may be watching the event on their televisions or streaming devices. An image 404 may be displayed on the television or streaming device without the avatars occupying the empty seats. The image 404 may be displayed to the online viewers 402 when the avatar audience creation program 110A, 110B is not being used during the live video broadcast of the event. In contrast, an image 406 may be displayed on the television or streaming device with the avatars occupying the empty seats. The image 406 may be displayed to the online viewers 402 when the avatar audience creation program 110A, 110B is being used during the live video broadcast of the event. When the avatar audience creation program 110A, 110B is being used during the live video broadcast of the event, the speakers 408 may be placed in the arena to augment the sound of the in-person viewers, or provide sound when there are no in-person viewers. The sound from the speakers 408 may be played in the arena itself and on the televisions or streaming devices of the online viewers 402.

Figure 5:
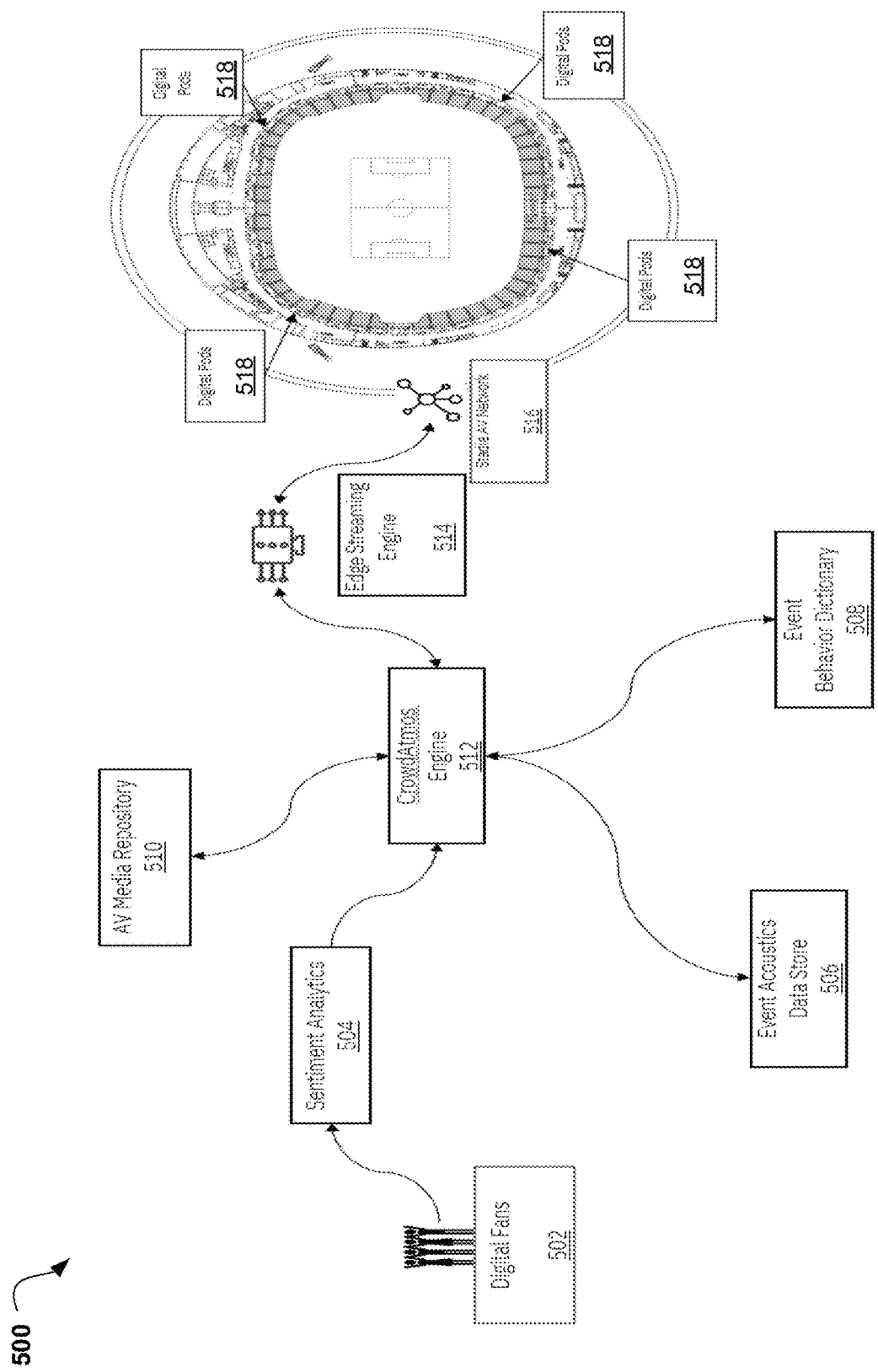
FIG. 5 is a diagram depicting an interaction between solution components of the process in FIG. 3 according to at least one embodiment.

Referring now to FIG. 5, a diagram 500 depicting an interaction between solution components of the process in FIG. 3 is shown according to at least one embodiment. Digital fans 502, also referred to herein as online viewers 402, may post text on their social media timelines and/or generate hashtags for the event. These posts and/or hashtags may form the social media data which may be fed to the sentiment analytics engine 504 to interpret and classify the emotions. The social media data may then be fed to the crowd atmosphere engine 512. The stadium characteristics stored in the event acoustics data store 506, the traditional behavior patterns of the event stored in the event behavior dictionary 508, and the various sounds stored in the AV media repository 510 may also be fed to the crowd atmosphere engine 512 to create the AV content that will be streamed in the stadium. The created AV content may then be fed to the edge streaming engine 514, from which the created AV content may be propagated to the stadium's AV network 516. The AV content propagated to the stadium's AV network 516 may then be displayed by the speakers 408 and/or the digital pods 518 placed at strategic locations in the stadium for optimal sound simulation and visual grandeur.

It may be appreciated that FIGS. 2, 3, 4, and 5 provide only an illustration of one implementation and do not imply any limitations with regard to how different embodiments may be implemented. Many modifications to the depicted environments may be made based on design and implementation requirements.

Figure 6:
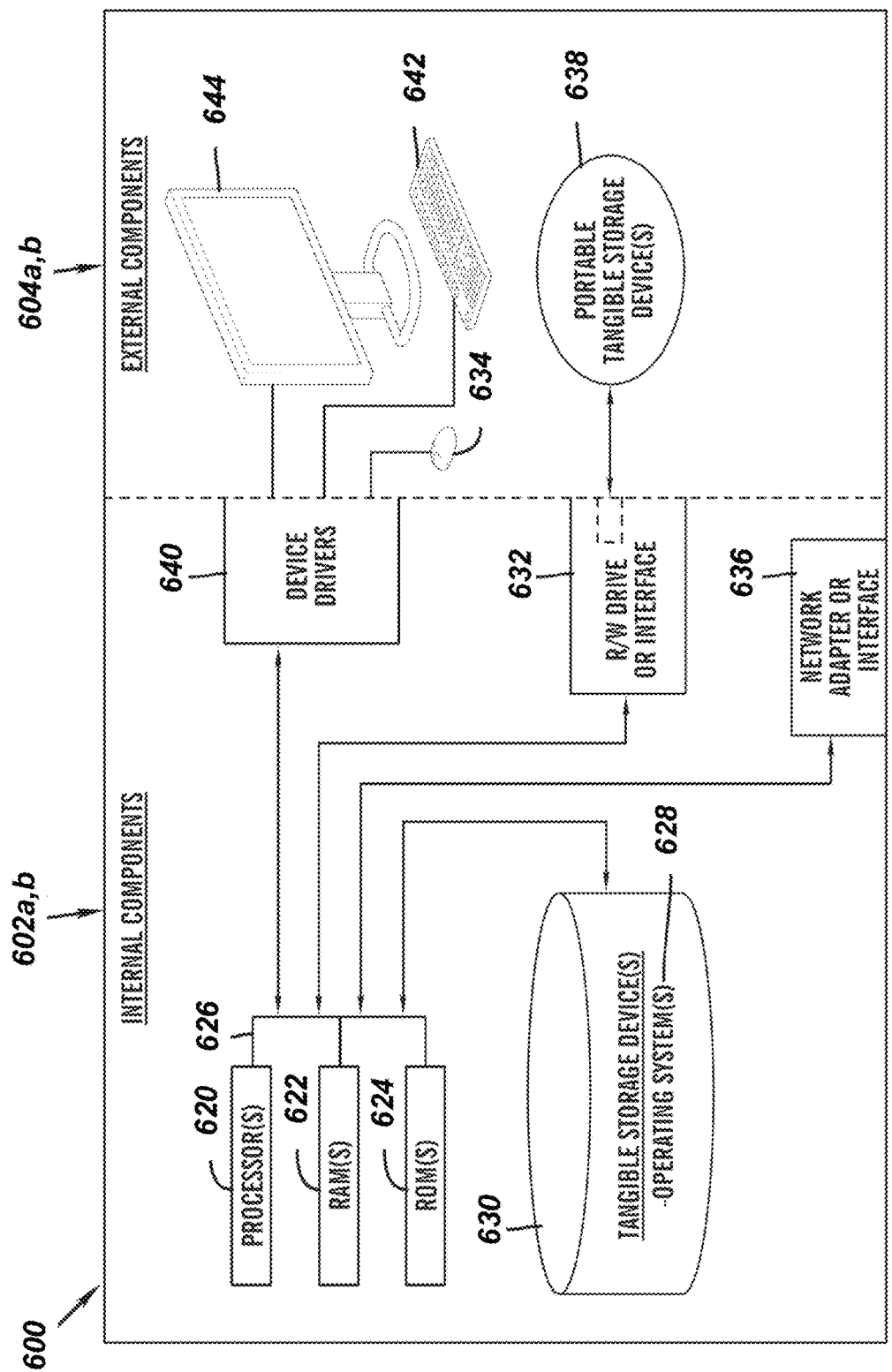
FIG. 6 is a functional block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 a,b and external components 604 a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the avatar audience creation program 110A in the client computing device 102 and the avatar audience creation program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 *a,b* also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the avatar audience creation program 110A, 110B, can be stored on one or more of the respective portable computer-readable tangible storage devices 638, read via the respective R/W drive or interface 632, and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. The software program 108 and the avatar audience creation program 110A in the client computing device 102 and the avatar audience creation program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software program 108 and the avatar audience creation program 110A in the client computing device 102 and the avatar audience creation program 110B in the server 112 are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
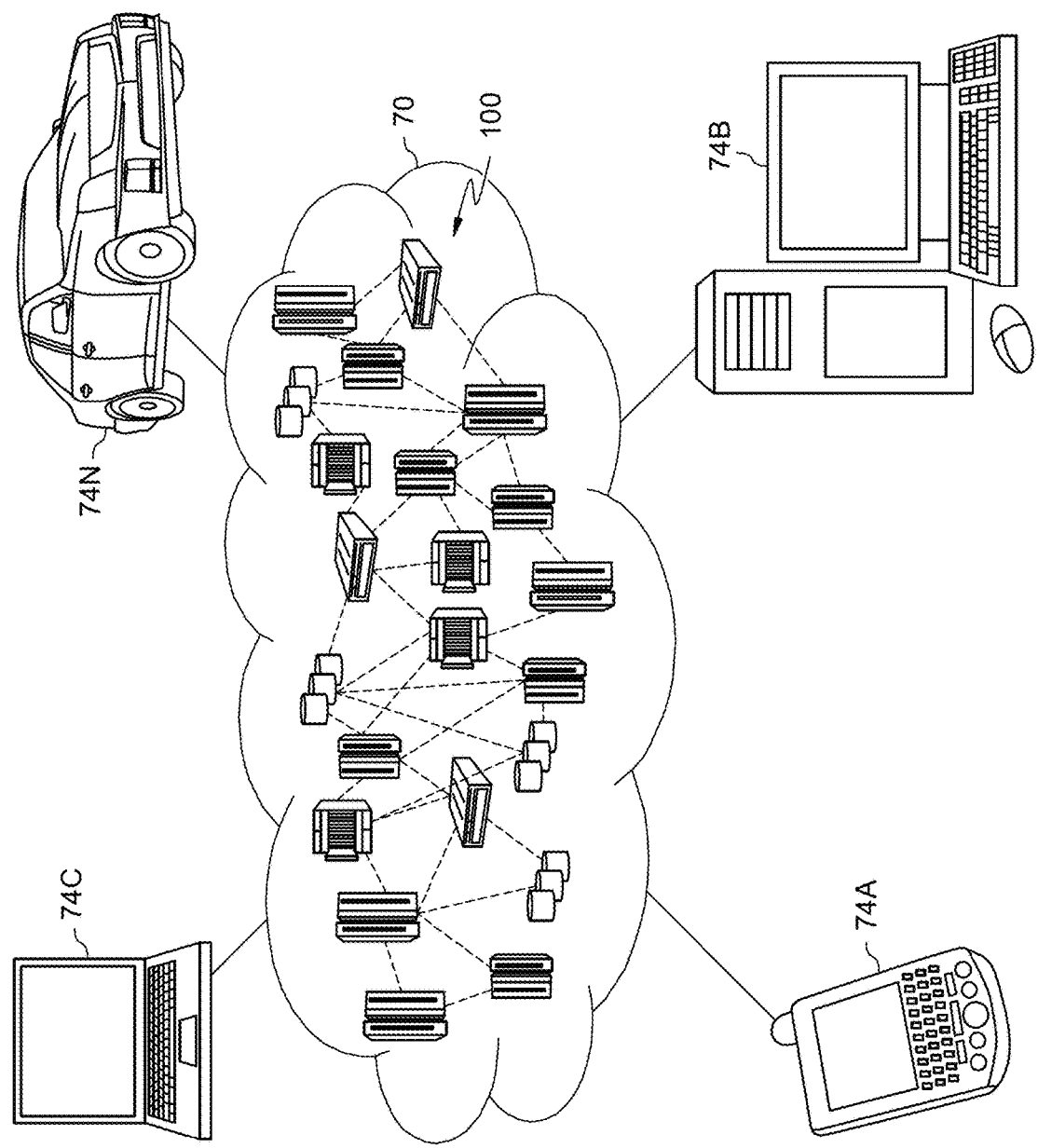
FIG. 7 depicts a cloud computing environment according to an embodiment of the present invention.

Referring now to FIG. 7, illustrative cloud computing environment 70 is depicted. As shown, cloud computing environment 70 comprises one or more cloud computing nodes 100 with which local computing devices used by cloud consumers, such as, for example, personal digital assistant (PDA) or cellular telephone 74A, desktop computer 74B, laptop computer 74C, and/or automobile computer system 74N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 70 to offer infrastructure, platforms and/or software as services for which a cloud consumer does not need to maintain resources on a local computing device. It is understood that the types of computing devices 74A-N shown in FIG. 7 are intended to be illustrative only and that computing nodes 100 and cloud computing environment 70 can communicate with any type of computerized device over any type of network and/or network addressable connection (e.g., using a web browser).

Figure 8:
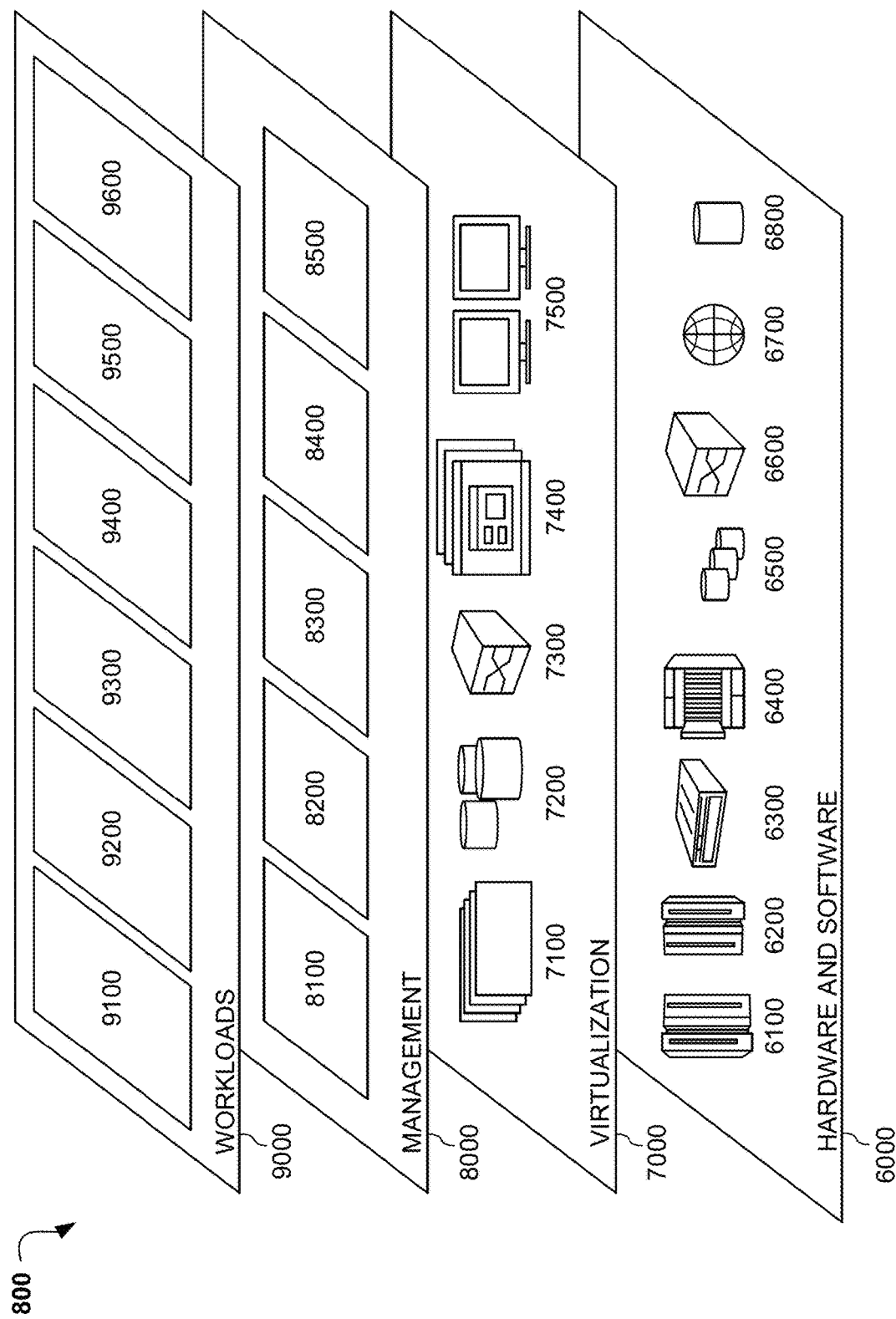
FIG. 8 depicts abstraction model layers according to an embodiment of the present invention.

Referring now to FIG. 8, a set of functional abstraction layers 800 provided by cloud computing environment 70 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and creating an avatar of an online viewer during a live video broadcast 9600. Creating an avatar of an online viewer during a live video broadcast 9600 may relate to identifying online viewers of an event in order to create an avatar of these online viewers that will be shown on a live broadcast of the event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of creating an avatar of an online viewer during a live video broadcast, the method comprising:
   receiving a number of in-person viewers at an event;
   identifying a number of online viewers watching the event remotely;
   determining whether the number of in-person viewers at the event is below a threshold level;
   in response to determining the number of in-person viewers at the event is below the threshold level, identifying a location of the in-person viewers at the event;
   analyzing reactions of the online viewers to scenarios of the event, wherein at least one analyzed reaction of the online viewers includes one or more bodily movements of each online viewer including at least one facial expression and at least one hand and arm gesture;
   creating an avatar for each of the online viewers based on profiles of the online viewers, wherein the created avatar for each online viewer performs the one or more bodily movements that are performed in real-time by the corresponding online viewer for whom the avatar is created including the at least one facial expression and the at least one hand and arm gesture during the event based on the analyzed reactions;
   populating, by one or more digital pods located at empty seats, each empty seat at the event with the created avatar for each online viewer; and
   displaying the created avatars as a hologram occupying the empty seats to the online viewers, wherein the created avatars are configured to be viewed by the in-person viewers, wherein one or more of the created avatars are configured to be relocated by at least one online viewer having a premium streaming subscription, and wherein in response to determining the number of online viewers exceeds a number of the empty seats at the event, displaying the created avatars in an order in which the online viewers logged into a streaming device of the online viewers.

2. The method of claim 1, further comprising:
   receiving social media data regarding the event;
   interpreting emotions of the online viewers based on the social media data;

identifying traditional behavior patterns of the event;
identifying characteristics of a stadium hosting the event;
creating audio/visual (AV) content based on the traditional behavior patterns and the stadium characteristics; and
displaying the AV content in the stadium.

3. The method of claim 2, wherein the social media data is selected from a group consisting of generated hashtags for the event, and text from social media timelines.

4. The method of claim 1, wherein one or more Internet of Things (IoT) Devices are utilized to analyze the reactions of the online viewers.

5. The method of claim 1, wherein if the event is a sporting event, the created avatars are populated into the empty seats based on a team preference of each online viewer, wherein the avatars supporting one team are grouped together, and wherein the avatars supporting another team are grouped together.

6. The method of claim 1, wherein the threshold level is set by an organizer of the event.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a number of in-person viewers at an event;
identifying a number of online viewers watching the event remotely;
determining whether the number of in-person viewers at the event is below a threshold level;
in response to determining the number of in-person viewers at the event is below the threshold level, identifying a location of the in-person viewers at the event;
analyzing reactions of the online viewers to scenarios of the event, wherein at least one analyzed reaction of the online viewers includes one or more bodily movements of each online viewer including at least one facial expression and at least one hand and arm gesture;
creating an avatar for each of the online viewers based on profiles of the online viewers, wherein the created avatar for each online viewer performs the one or more bodily movements that are performed in real-time by the corresponding online viewer for whom the avatar is created including the at least one facial expression and the at least one hand and arm gesture during the event based on the analyzed reactions;
populating, by one or more digital pods located at empty seats, each empty seat at the event with the created avatar for each online viewer; and
displaying the created avatars as a hologram occupying the empty seats to the online viewers, wherein the created avatars are configured to be viewed by the in-person viewers, wherein one or more of the created avatars are configured to be relocated by at least one online viewer having a premium streaming subscription, and wherein in response to determining the number of online viewers exceeds a number of empty seats at the event, displaying the created avatars in an order in which the online viewers logged into a streaming device of the online viewers.

8. The computer system of claim 7, further comprising:
receiving social media data regarding the event;
interpreting emotions of the online viewers based on the social media data;
identifying traditional behavior patterns of the event;
identifying characteristics of a stadium hosting the event;
creating audio/visual (AV) content based on the traditional behavior patterns and the stadium characteristics; and
displaying the AV content in the stadium.

9. The computer system of claim 8, wherein the social media data is selected from a group consisting of generated hashtags for the event, and text from social media timelines.

10. The computer system of claim 7, wherein one or more Internet of Things (IoT) Devices are utilized to analyze the reactions of the online viewers.

11. The computer system of claim 7, wherein if the event is a sporting event, the created avatars are populated into the empty seats based on a team preference of each online viewer, wherein the avatars supporting one team are grouped together, and wherein the avatars supporting another team are grouped together.

12. The computer system of claim 7, wherein the threshold level is set by an organizer of the event.

13. A computer program product, the computer program product comprising:
one or more computer-readable tangible storage medium and program instructions stored on at least one of the one or more tangible storage medium, the program instructions executable by a processor capable of performing a method, the method comprising:
receiving a number of in-person viewers at an event;
identifying a number of online viewers watching the event remotely;
determining whether the number of in-person viewers at the event is below a threshold level;
in response to determining the number of in-person viewers at the event is below the threshold level, identifying a location of the in-person viewers at the event;
analyzing reactions of the online viewers to scenarios of the event, wherein at least one analyzed reaction of the online viewers includes one or more bodily movements of each online viewer including at least one facial expression and at least one hand and arm gesture;
creating an avatar for each of the online viewers based on profiles of the online viewers, wherein the created avatar for each online viewer performs the one or more bodily movements that are performed in real-time by the corresponding online viewer for whom the avatar is created including the at least one facial expression and the at least one hand and arm gesture during the event based on the analyzed reactions;
populating, by one or more digital pods located at empty seats, each empty seat at the event with the created avatar for each online viewer; and
displaying the created avatars as a hologram occupying the empty seats to the online viewers, wherein the created avatars are configured to be viewed by the in-person viewers, wherein one or more of the created avatars are configured to be relocated by at least one online viewer having a premium streaming subscription, and wherein in response to determining the number of online viewers exceeds a number of the empty seats at the event, displaying the created avatars in an order in which the online viewers logged into a streaming device of the online viewers.

14. The computer program product of claim 13, further comprising:
   receiving social media data regarding the event;
   interpreting emotions of the online viewers based on the social media data;
   identifying traditional behavior patterns of the event;
   identifying characteristics of a stadium hosting the event;
   creating audio/visual (AV) content based on the traditional behavior patterns and the stadium characteristics; and
   displaying the AV content in the stadium.

15. The computer program product of claim 13, wherein one or more Internet of Things (IoT) Devices are utilized to analyze the reactions of the online viewers.

16. The computer program product of claim 13, wherein if the event is a sporting event, the created avatars are populated into the empty seats based on a team preference of each online viewer, wherein the avatars supporting one team are grouped together, and wherein the avatars supporting another team are grouped together.

17. The computer program product of claim 13, wherein the threshold level is set by an organizer of the event.

* * * * *